July 10, 1962 R. HANSEN 3,043,388
CONTROL UNIT FOR A CONVEYANCE
Filed June 20, 1960 7 Sheets-Sheet 1

INVENTOR
Rudolf HANSEN
BY Otto John Munz.
ATTORNEY

July 10, 1962  R. HANSEN  3,043,388
CONTROL UNIT FOR A CONVEYANCE
Filed June 20, 1960  7 Sheets-Sheet 2

INVENTOR
Rudolf HANSEN
BY
ATTORNEY

July 10, 1962 R. HANSEN 3,043,388
CONTROL UNIT FOR A CONVEYANCE
Filed June 20, 1960 7 Sheets-Sheet 3

INVENTOR
Rudolf HANSEN
BY
ATTORNEY

July 10, 1962  R. HANSEN  3,043,388
CONTROL UNIT FOR A CONVEYANCE
Filed June 20, 1960  7 Sheets-Sheet 4
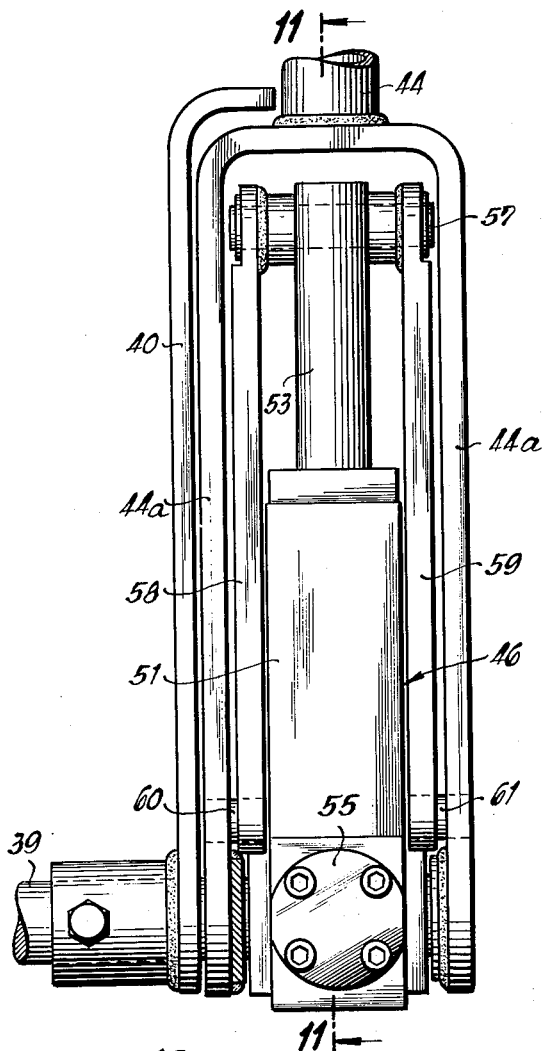
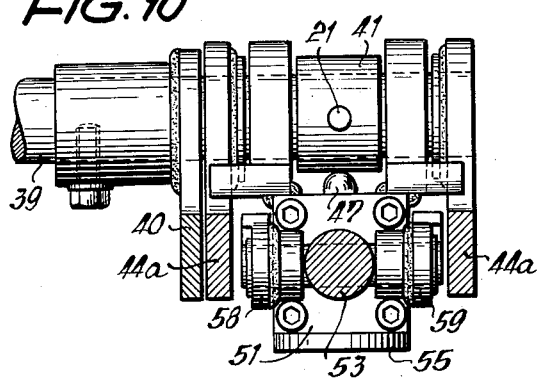
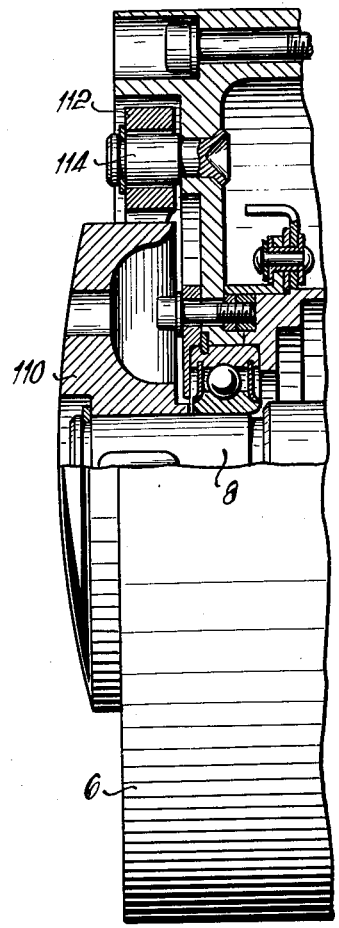
INVENTOR
Rudolf HANSEN
BY Otto John Munz
ATTORNEY

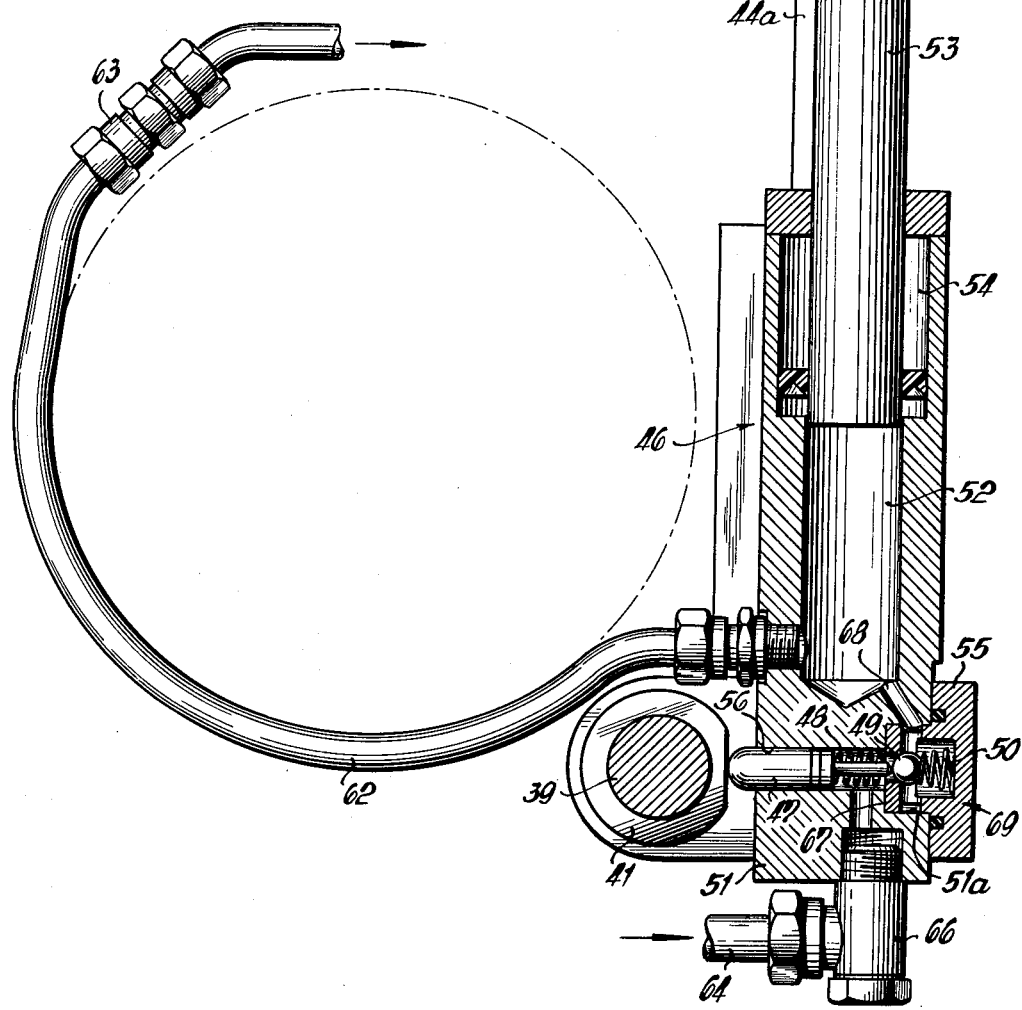

INVENTOR
Rudolf HANSEN
BY
Otto John Munz.
ATTORNEY

# United States Patent Office 3,043,388
Patented July 10, 1962

3,043,388
CONTROL UNIT FOR A CONVEYANCE
Rudolf Hansen, Hamburg-Hamm, Germany, assignor to Friedrich Jungheinrich, Hamburg-Billstedt, Germany
Filed June 20, 1960, Ser. No. 37,531
Claims priority, application Germany June 29, 1959
22 Claims. (Cl. 180—19)

This invention relates to commercial load conveyances and, more particularly, to those vehicles known as lift trucks.

Such self-propelled trucks are widely used in factories, warehouses, loading platforms and storage areas to lift, convey and deposit, proportionately heavy loads. The purpose and operation of such trucks make it essential that they be compact, easily maneuverable, have a high load-to-weight ratio and be safe and sure in operation.

This latter desirable feature calls for a truck which, while picking up a load, is fully immobilized against movement and whose lifting mechanism when the vehicle is moving, cannot be operated either to raise or to lower the carried load.

It is the chief object of this invention to provide a highly maneuverable, self-propelled truck of the type described which embodies in a simple foolproof construction, all of the features mentioned in the preceding paragraphs.

Another object is to provide a lift truck having a combined control and steering handle which is also utilized to effect lifting of a load.

A further object is the provision in a truck of the type mentioned, of a single compact propelling, lifting and steering unit which is propelled by a self-contained electric motor driving one or more ground-engaging wheels.

Another object is the provision of a truck as in the immediately preceding paragraph, wherein a load cannot be lifted unless and until the motor circuit is open and the brakes applied.

A still further object is to provide a truck of the nature specified having a manually-operated steering handle and so related with the lifting mechanism that the latter is inoperable during movement of the handle throughout its steering range of positions.

Yet another object is to provide a brake-operating mechanism, motor circuit switch and hydraulic valve lift control so co-ordinated and arranged as to effect the functions previously described from a single control element connectable with and, when connected, operated by the aforesaid steering handle.

Another object is to make the aforesaid control element, movable to a brake-applying, switch-opening position automatically in response to release from the steering handle.

Yet another object is to provide a combined propelling, hydraulic lift and steering unit as mentioned in the preceding paragraphs and wherein the plunger or piston element of the hydraulic lift is vertically disposed and is directly and swivelably connected with the load-carrying element of the truck, so that steering can be effected by turning the unit about the axis of the plunger.

Still another object is to provide a hydraulic lift for a truck of the type mentioned, wherein a single valve element as moved by the aforesaid control element (a) enables the load to be lifted by oscillation of the steering handle only when the brakes are applied, (b) connect the pressure-fluid inlet thereto directly to exhaust when said handle and element are connected and positioned in steering range and (c) at the same time holds fluids under pressure in the hydraulic cylinder.

Yet another object is to provide a lift truck control as previously described, wherein the steering handle must be moved out of steering range to be capable of connection with such control element.

Other objects and advantages of the invention will be apparent to those skilled in the art, after a study of the following detailed description in connection with the accompanying drawing.

In the drawing:

FIGURE 9 is a detail view to an enlarged scale, of the lower end of the control handle and its association with the hydraulic pump unit and control shaft;

FIGURE 10 is a view at right angles to FIGURE 9 showing the construction by which rotation of the control shaft to predetermined position renders the hydraulic lift system operable;

FIGURE 11 is a sectional view corresponding to FIGURES 9 and 10 and taken in a plane identified by the line 11—11, FIGURE 9;

FIGURE 13 is an axial section showing one end of the driving motor and the brake drum incorporated therewith;

*The Motor-Propulsion Unit*

Figure 5:
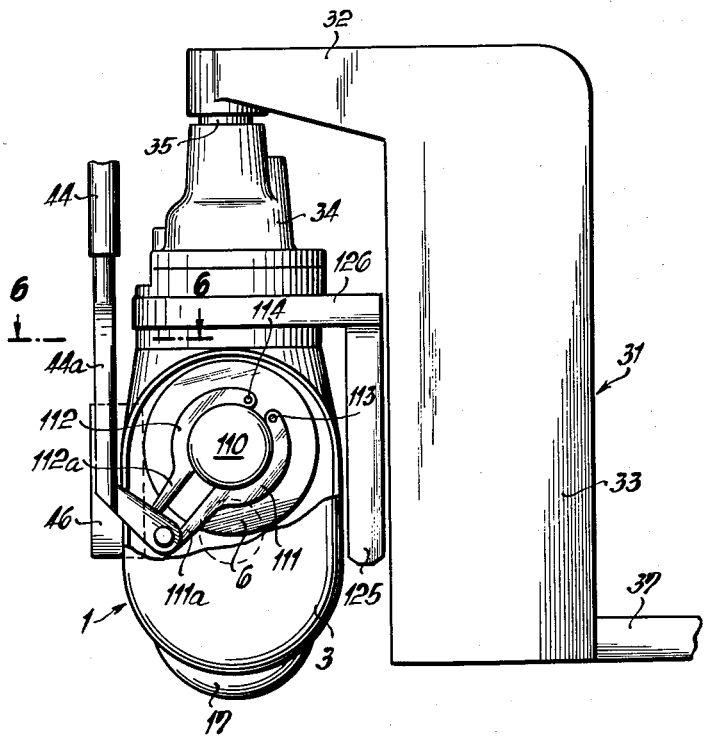
FIGURE 5 is a side elevation of the rear portion of the truck, showing the propelling unit with brake applied and steering handle in vertical position.
Figure 6:
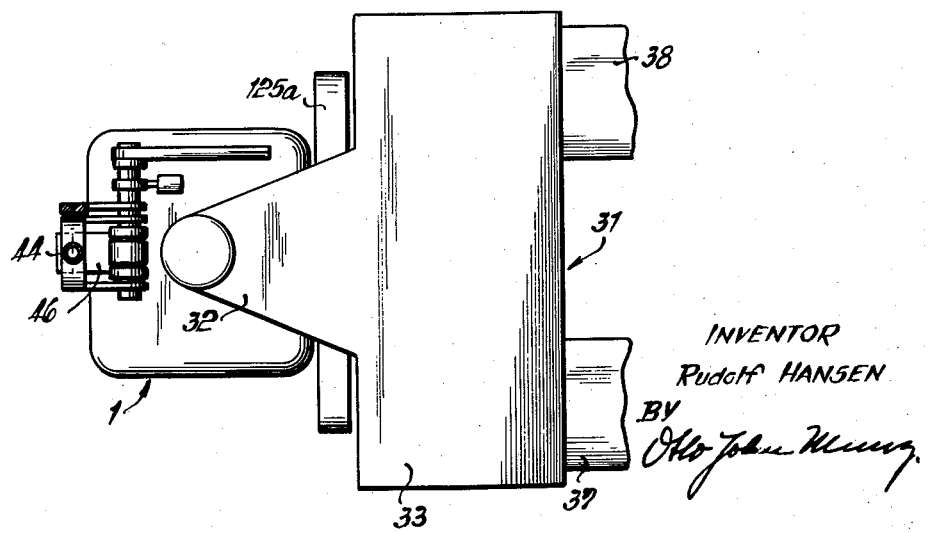
FIGURE 6 is a plan view corresponding to FIGURE 5 but showing the steering handle and lever of the control shaft in section, as in a plane identified by the line 6—6 of FIGURE 5.

In the model selected for illustration, a compact, self-contained driving and control unit generally identified at 1, FIGURES 5 and 6, is supported by a driving wheel 17, driven through reduction gearing, by a reversible battery-powered motor carried by the frame or casing.

Figure 7:
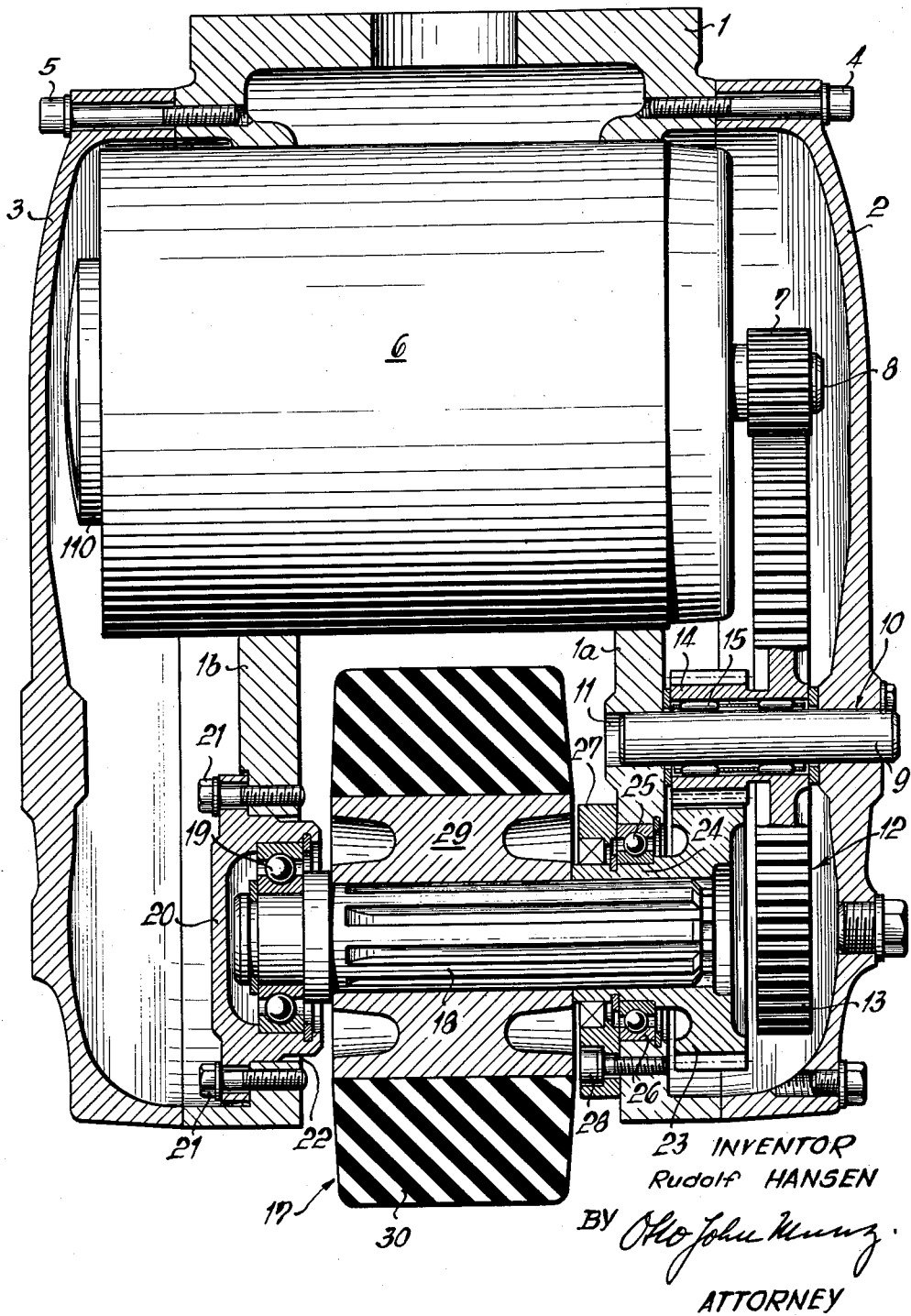
FIGURE 7 is an elevational view to an enlarged scale, partly in section, showing the drive motor, the driving wheel, and the speed-reducing drive from motor to wheel.

Referring more particularly to FIGURE 7, frame 1 includes end plates 2 and 3 held in place by cap screws 4 and 5, and mounts a driving motor 6 having a pinion 7 on the projecting end of its shaft 8. An intermediate shaft 9 has its ends fixed in an aperture 10 in end plate 2 and a second aligned aperture 11 in part 1a of frame 1. A reduction gear unit generally identified at 12, comprises a large gear 13 meshing with pinion 7, and a second pinion 14. Both gear 13 and pinion 14 are integral with a common sleeve 15 journaled by anti-friction bearings on shaft 9.

In the model shown, a single driving wheel 17 is used, comprising a shaft 18 journaled at one end in an antifriction bearing 19 mounted by a bushing 20 removably held by cap screws 21 in an opening 22 in part 1b of frame 1. The other, or drive end of shaft 18 has a pinion 23 keyed thereto. This pinion includes a sleeve-like hub 24 journaled in anti-friction bearing 25, in turn mounted within an aperture 26 in frame part 1a and held in place by a grease retaining ring 27. This ring is removably held in place by cap screws such as 28. The wheel itself comprises a hub 29 keyed to shaft 18 between bearings 19 and 25 and mounting a tire 30, shown as of solid rubber.

Thus in a manner obvious from inspection of FIGURE 7, rotation of motor 6 drives wheel 17 at greatly reduced speed.

Figure 8:
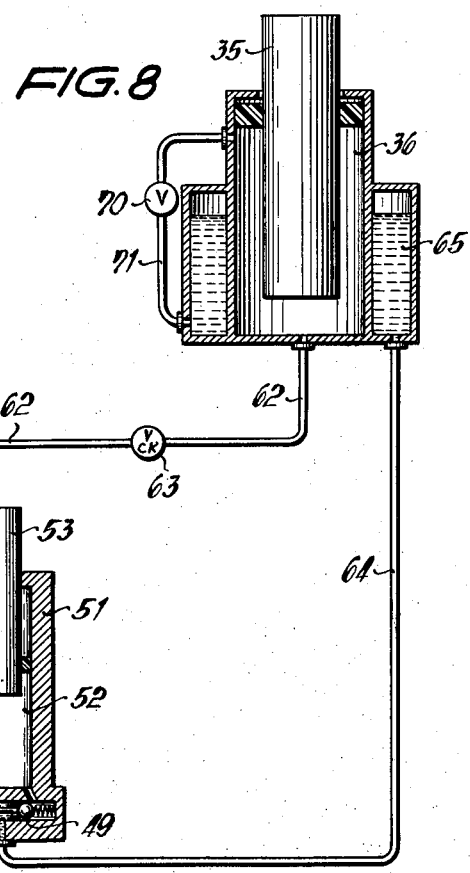
FIGURE 8 is a diagrammatic view showing the hydraulic lift, pump and interconnections.

The rear end of the load carrying unit 31 is shown upon FIGURES 5 and 6 to have a projection 32 extending rearwardly from the top of its battery-compartment, 33. This projection has a swivel connection about a substantially vertical axis, with a hydraulic unit, the casing 34 of which is bolted or otherwise secured to the top of frame or assembly 1. See FIGURE 5. The hydraulic unit includes a heavy shaft 35 connected at its top with projection 32 and slidably fitting a hydraulic cylinder 36 (FIGURE 8) fixed with casing 34. By this construction, the truck may be propelled forwardly or rearwardly through power rotation of wheel 17, steered by swiveling of frame 1 about the substantially vertical axis of shaft 35, and the truck elevated by the introduction into the aforesaid hydraulic cylinder, of fluid under pressure under control of the operator. The lifting and load-supporting elements are shown as forks 37 and 38 which, of course, are supported at their forward ends by rollers, as subsequently described.

The Control Mechanism

A shaft 39 is journaled on frame 1 at the rear thereof, in horizontal transverse position and has fixed thereto, a short lever arm or control element 40, and cam elements 41, 42, and 43, whose functions are subsequently described.

The handle, rod or pole, by which the truck is manually controlled, is identified at 44 and, in the vertical position shown upon FIGURES 5 and 6, extends upwardly a distance such that its top end is at convenient height for manual grasping and actuation.

Figure 1:
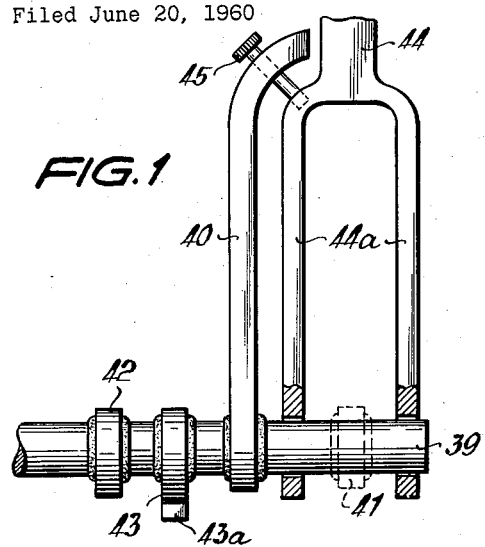
FIGURE 1 is a schematic detail view showing the control element with its cams, the steering handle, and the releasable connection between the two.

The lower end of rod 44 is forked, as indicated at 44a and its tines are pierced at their lower ends to receive shaft 39 with a smooth fit as will be clear from inspection of FIGURE 1. Means are provided by which the lever arm 40 may be manually connected with and detached from handle 44. In the drawing, this means is shown as a simple pin 45 carried by arm 40 and axially slidable into and withdrawable from, a hole in one tine 44a. Numerous other means may be substituted for this connection, including a foot operated latch or kick plate, not shown.

Thus, when pin 45 is in the connecting position shown upon FIGURE 1, control handle or rod 44, arm 40, shaft 39 and the cam elements carried thereby, pivot as a unit about the axis of the shaft, and the handle is thereby effective for controlled turning of the shaft. It should be noted that, irrespective of whether or not it is so connected with arm 40, the handle is operable for up-and-down pivotal motion. By any suitable means, not shown, the arm 40 is spring-urged into a vertically-upward position, such as is shown upon FIGURE 1. Since the arm is fixed with shaft 39, the cam elements fixed with the shaft are likewise urged by such spring means into a predetermined angular relation with respect to the frame 1.

The Hydraulic Lift

The hydraulic cylinder previously mentioned is a part of a hydraulic system incorporated into the vehicle. This system includes a combined pump and valve unit 46 which, as shown upon FIGURE 6, is mounted between the tines 44a of the control rod or handle.

Figure 4:
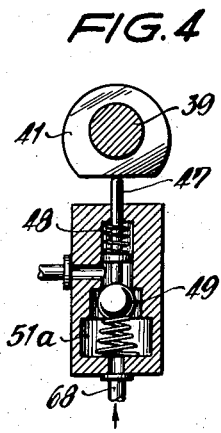
FIGURE 4 is a detail view showing the hydraulic lift control-valve and the manner in which it is operated by the control element.

FIGURE 4 shows schematically, and FIGURES 9, 10 and 11, in detail, the position of the valve parts, as controlled by the cam 41, when arm 40 is in its aforesaid vertical or other predetermined position, to which it is continuously urged by spring means, not shown. Referring more particularly to FIGURES 9, 10, and 11, unit 46 includes a plunger 47 urged outwardly into engagement with cam 41 by a spring 48. The inner end of the plunger contacts a ball valve 49 urged into closure position by a spring 50. Unit 46 comprises a combined pump cylinder and valve housing 51 fixed with frame 1 in any convenient manner, as by a bracket, not shown. Housing 51 has an upwardly-opening bore 52 within which a piston 53 is slidable, through a combined guide and gland 54.

The lower end of unit 46 is formed as a box-like valve casing 55 having a bore 56 opening through the wall thereof facing the axis of shaft 39 and radially thereof. The aforesaid plunger 47 is slidably mounted in this bore and, in a manner obvious from inspection of FIGURES 4 and 11, is urged by spring 48 into contact with cam 41.

At its top, piston 53 is pivoted to the central part of a cross-head pin 57 whose ends are pivotally connected with the upper ends of a pair of depending links 58 and 59. See FIGURE 9. The lower ends of these links are pivotally connected by coaxial pivot pins 60 and 61, with the lower ends of respective forks 44a. Since the axis of pins 60 and 61 is offset upwardly and rearwardly of the axis of the shaft 39, about which forks 44a pivot, angular movement of the control handle 44 effects reciprocation of piston 53 within cylinder 51.

Outlet pipe 62 extends from the bottom of cylinder bore 52, through one-way or check valve 63 to hydraulic cylinder 36. A return line 64 extends from a supply tank or sump 65, FIGURE 8, to a fitting 66 threaded into the base of valve housing 51. Referring more particularly to FIGURE 11, the valve chamber is formed by a bore 51a in which is fixed a valve seat 67 provided with a beveled aperture for seating ball 49. A passage 68 leads from the lower end of cylinder bore 52 to the valve chamber 51a on the ball side of plate 67. The chamber is closed with a pressure-tight fitting 69 apertured to receive one end of spring 50.

The construction and arrangement of parts are such that when lever arm 40 is in the vertical position, to which it is spring-urged, the flat on cam 41 is in contact with and normal to the direction of reciprocation of plunger 47. In this position, shown upon FIGURE 11, the inner end of the plunger is free of ball 49 which is then urged onto its seat by spring 50. Therefore, at this time, with lever 40 and handle 44 unconnected at 45, oscillation of the handle about the axis of shaft 39 reciprocates piston 53 within its cylinder and, on the downward stroke, forces pressure fluid out through pipe 62, through one-way valve 63, to hydraulic cylinder 36. As the piston moves upwardly on its suction stroke, ball 49 is unseated to draw liquid from tank 65 by way of pipe 64, while pressure in the cylinder 36 is held by valve 63 until released by opening of a manually-controlled by-pass valve 70, schematically shown at FIGURE 8, in a line 71 connecting cylinder 36 and tank or sump 65.

The operation of the hydraulic lift will be clear from the foregoing description and may be briefly resumed as follows:

When lever 40 is disconnected from handle 44 at releasable attachment 45, lever 40 is held in its erect position wherein cam 41 has the position shown upon FIGURE 11, and one-way valve 49 is closed. Under such condition oscillation of handle 44 and the resulting reciprocation of piston 53 draws oil from the sump through valve 49, and forces it into a cylinder 36 to thereby elevate shaft or piston 35 and the load-supporting elements 37, 38. The elevated position is maintained by reason of one-way valve 63.

When connection 45 is effective to connect lever 40 for synchronous movement with handle 44, any movement of the handle from a substantially vertical position, correspondingly rotates cam 41 to thereby shift plunger 47 to a position holding ball 49 off its seat. Under such condition, oscillation of handle 44 is ineffective to force liquid from the sump to cylinder 36. However, pressure in cylinder 36 is maintained until release by manual opening of valve 70. It is understood, of course, that valve 70 may be a solenoid type instrument, for example, and remotely controlled by the opreator, as by a switch on the distal end of handle 44. As a result of this construction any operation of handle 44 such as may occur incidental to oscillation of the handle during manipulation of the truck, is ineffective to force fluid into the lift, but merely surges fluid between pump and tank or sump because ball 49 is at such times held off its seat by the action of cam 41.

The Motor Control Circuits

Figure 12:
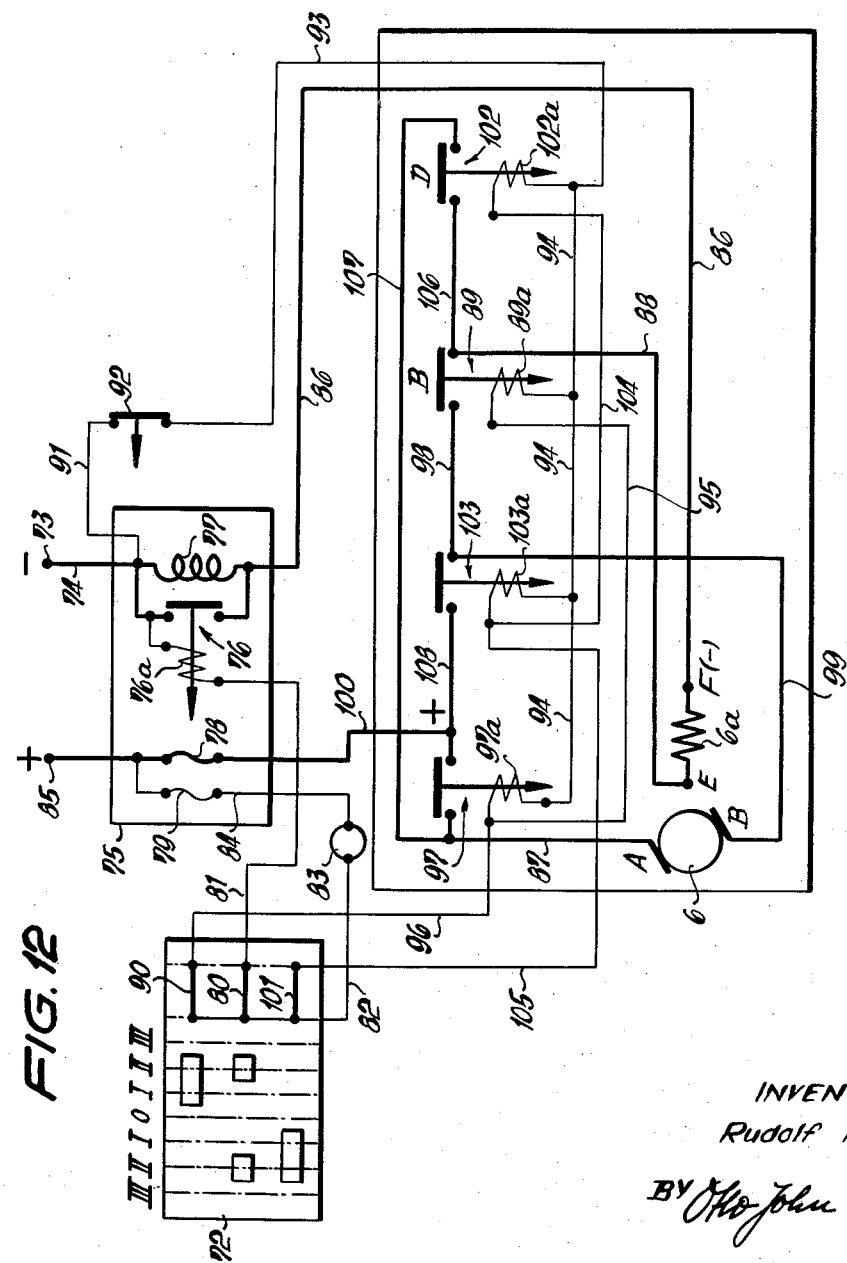
FIGURE 12 is a wiring diagram of the motor control.

Motor 6 is powered by batteries, not shown, positioned in compartment 33. Referring in detail to FIGURE 12, a control switch box 72 is fixed to the distal end of handle 44, in position convenient for the operator of the vehicle and embodies a number of relay control switches.

From negative battery terminal 73 a line 74 enters a fuse and resistance box 75 housing a starting relay 76, a resistance unit 77 and primary and secondary fuses 78 and 79, respectively.

The primary circuit of relay 76 is connected in parallel with low-speed resistance 77 so that when the relay is closed, the resistance is shorted out. The solenoid 76a of relay 76 is under control of a switch 80, in switch box 72 so that, when manually closed, current flows from line 74 through solenoid 76a, line 81, switch 80, line 82, including shaft lock 83, line 84, and fuse 79, back to positive battery terminal 85.

On closure of switch 80 to energize relay 76, closure of a second switch 90 in box 72 energizes a pair of relays 89 and 97, to start the motor. Thus, when switch 90 is closed, the circuit through relay coil 89a is closed from terminal 73, through lead 74, secondary lead 91, safety switch 92, lines 93 and 94, solenoid coil 89a, lines 95 and 96, switch 90 and back to the positive terminal 85 over line 82 as previously traced.

Closure of switch 90 also energizes the solenoid 97a of relay 97 by way of lines 74, 93, 94, solenoid 97a, lead 96, switch 90 and return through line 82, as previously traced.

With relays 89 and 97 closed, the circuit of motor 6 is closed by way of negative terminal 73, line 74 presently energized relay 76, line 86, motor field coils 6a, line 88, relay 89, lines 98, 99, the armature of motor 6, line 87, relay 97, lead 100 and fuse 78 to positive terminal 85. Motor 6 is thereby energized to rotate in the forward direction.

Closure of a third switch 101 in box 72 at the distal end of control handle 44 effects reversal of motor 6 by energizing a second pair of relays 102 and 103. Thus, with switch 80 still closed and relay 76 consequently energized, a circuit is completed from terminal 73, line 91, switch 92, line 93, solenoid 102a of relay 102, line 104, line 105, switch 101, and line 82 back to positive terminal 85, as previously traced.

Solenoid 103a of relay 103 is also energized over the same circuit as traced in the preceding paragraph, up to and including line 93, thence by line 94, solenoid 103a, line 105, switch 101, and line 82 back to the positive terminal 85.

With relays 102 and 103 closed, the motor circuit is likewise closed by way of main line 86, as previously traced, field coils 6a, line 88, line 106, relay 102, lines 107 and 87, through armature 6, line 99, relay 103, and lines 108 and 100 to positive terminal 85. Make-ready switch 80 can be closed at any time, but switches 90 and 101 are actuated by a single shift rod or lever, not shown. For example, shifting the rod in one direction from neutral closes switch 90 while shifting it in the opposite direction from neutral closes switch 101. The two switches therefore cannot be closed simultaneously. Also, switch 80 may be so connected with the aforesaid control rod or bar as to be closed for both directions of shift thereof from the aforesaid neutral position. However, when switch 80 is independently mounted and actuated, closure of switch 90, or alternatively, switch 101, effects low-speed operation of motor 6 in a corresponding direction or rotation since resistance 77 is at this time in the main circuit of the motor.

Figure 3:
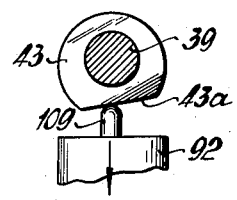
FIGURE 3 is a detail view showing the motor-circuit safety switch and the manner in which the motor circuit is opened when the control element is in load-lifting position.

It will be noted that, with switch 92 open, no relays can be energized and hence the motor cannot be energized for rotation in either direction. Referring more specifically to FIGURE 3, switch 92 is shown as positioned closely adjacent shaft 39. The switch is normally spring-urged to circuit-open position, but is closed by inward movement of a rod 109 in response to turning of cam 43 fixed to shaft 39 as previously described.

As shown in FIGURE 3 the cam has a flat 43a which, in a position in contact with and substantially normal to the direction of movement or translation of rod 109 enables the rod to move forwardly to switch-opening position. In all other positions of rotation of cam 43, switch 92 is closed and motor 6 is thus placed under control of the switches in box 72. The open position of switch 92 as just described corresponds to the vertical spring-urged position of lever 40. Consequently, when lever 40 is free of handle 44, that is, when connecting means 45 is open, or when the lever and handle are connected and together in a substantially vertical position, the motor cannot be operated. Conversely, when connection 45 is rendered effective and handle 44 and lever 40 are rotated downwardly as a unit, switch 92 is closed. If desired, the shift rod controlling switches 90 and 101 may be spring-urged into neutral or circuit-opening position.

The Brake and Control Therefor

Shaft 8, FIGURE 13, of the driving motor 6, has a brake drum 110 fixed thereto at its end remote from pinion 7. A pair of brake shoes 111 and 112 are individually pivoted at 113 and 114, FIGURE 5, to a part of the motor casing and in a manner obvious from inspection of this figure, surround the drum 110. The shoes include substantially spaced parallel arms 111a and 112a extending from their free ends, on opposite sides of cam 42 fixed upon shaft 39. The shoes are urged into braking position by mechanism comprising a bolt 115 fixed in arm 112a and extending loosely through an aperture in arm 111a. A coil spring 116 surrounds the projecting end of the bolt and, in a manner obvious from inspection of FIGURE 2, urges the shoes together into position wherein they engage about the drum 110 and effect a very great braking effect upon wheel 17 because of the reduction drive between the motor and wheel as previously described.

Figure 2:
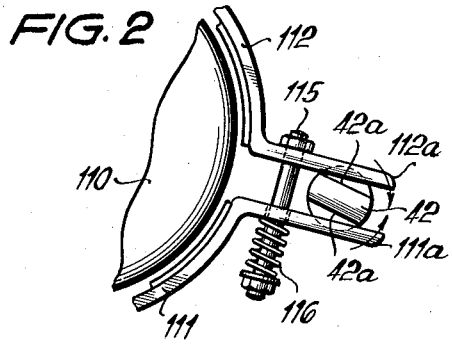
FIGURE 2 is a detail view showing a portion of the normally-applied brake and the manner in which it is released by movement to a certain position, of the control element.

The cam 42 is formed with two parallel oppositely-disposed flats 42a. FIGURE 2 shows the approximate position of the flats when the lever arm 40 and handle 44 are in vertical position. In this position the brakes are applied and the truck is immobile. The arrangement and construction are such that when the handle and the lever arm are connected at 45 and the handle is dropped or deliberately moved to substantially horizontal position, that is, when cam 42 has been rotated about 90° from the position shown upon FIGURE 2, the brakes are again applied. By this construction, should the operator lose his grip upon the handle or inadvertently drop it, the vehicle is automatically brought to a standstill by the fall of the handle. In positions between these 90° limiting positions, the brakes are released so that the vehicle may move under the drive of its motor. Thus the truck may be brought to a stop, either by dropping or lower- of the handle, or by a release of lever arm 40 from handle 44, followed by automatic movement of the arm into the vertical position. When the handle is dropped, the switch at the end thereof, if spring pressed to open or neutral position, opens the motor circuit. When arm 40 is released from handle 44, movement of the former into the vertical opens safety switch 92. In either event the motor is de-energized.

The Forward Fork-Lift

Means are provided for elevating and lowering the forward ends of forks 37 and 38 synchronously with corresponding movement of extension 32 by hydraulic piston 35.

Figure 14:
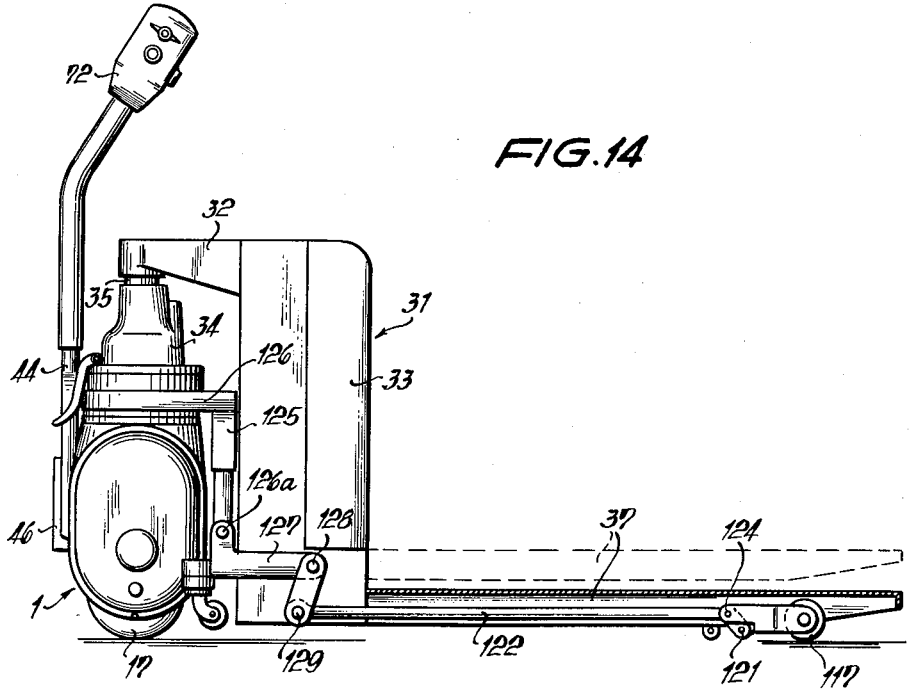
FIGURE 14 is a side elevation of the complete truck and showing, especially, the mechanism for elevating the forward end of the lift forks synchronously with the hydraulic lift.
Figure 15:
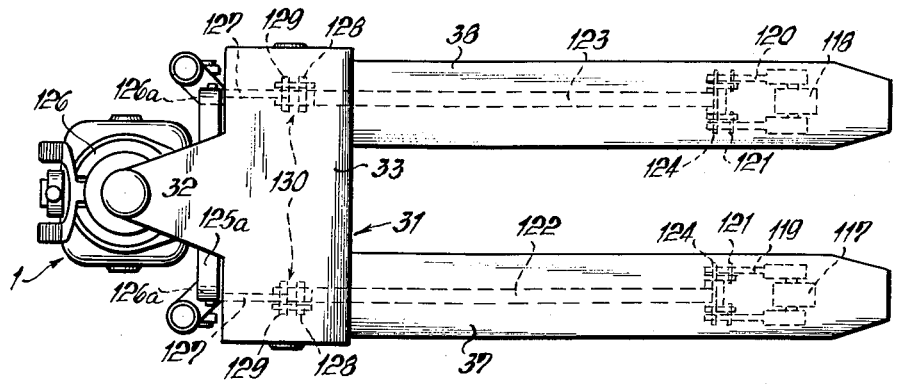
FIGURE 15 is a plan view corresponding to FIGURE 14.

Referring especially to FIGURES 14 and 15, the forward ends of the fork are supported by rollers 117 and 118, each journaled in a respective frame 119 and 120. Each frame comprises a pair of parallel laterally spaced arms or bell cranks, rigidly interconnected at one end and journaling a respective one of the aforesaid rollers between them at the other end. The frames or bell cranks are pivoted to the forward end of forks 37 and 38 on a common transverse axis 121.

A pair of push rods 122 and 123 extend longitudinally beneath and along each respective fork. Rod 122 is pivoted at its forward end to frame or bell crank 119, on an axis 124 which is a little above and rearwardly of axis 121. FIGURES 14 and 15 show frames 119 and 120 in a limiting position of counterclockwise pivotal adjustment, as viewed upon FIGURE 14, which position may be determined by stops or abutments on the frame engaging the respective forks. Rod 123 is identical in all respects, with rod 122 and its forward end is similarly connected with frame 120. Thus as rods 122 and 123 are translated longitudinally forwardly as the parts are viewed upon FIGURES 14 and 15, the frames are pivoted clockwise and with rollers 117 and 118 in engagement with the floor or other supporting surface, act to elevate the forward ends of the forks.

A frame 125 (see also FIGURES 5 and 6) is located between compartment 33 and the propelling unit, and includes an integral horizontal rearwardly-extending ring element 126 swiveled to the frame or casing 1 in a circular channel formed therein or in a part rigidly attached thereto. The axis of this ring element is coincident with the axis of shaft 35. Frame 125 includes a cross bar 125a at its lower end. This bar extends transversely such that its ends are in substantial alignment with respective push rods 122 and 123. Frame 125 is confined or restricted by any suitable linear guide means, not shown, to vertical translation on and along compartment 33; and by virtue of its integral ring 126 it acts as a guide for the propelling unit to maintain the axis of shaft 35 vertical without, however, in any way impeding rotation of the propelling unit about the axis of this shaft in steering and manipulation into and out of loading positions. Furthermore, by the construction just described, as the pump is operated to elevate shaft or piston 35, compartment 33 moves vertically with respect to frame 125, which, by reason of ring 126, is fixed in the vertical direction, with the propelling unit.

The ends of bar 125a are pivotally connected on a common transverse axis 126 to the corresponding ends of a pair of identical bell cranks, one of which 127 is clearly shown upon FIGURE 14 as pivoted at 128 to a rigid part of compartment 33 or its attached load-carrying frame. The other end of the bell crank is pivotally connected at 129 with the contiguous end of rod 122. The other bell crank, not shown, is pivoted to frame 33 on a common transverse axis, identified at 130, FIGURE 15 and is similarly pivotally connected with rod 123.

By the construction just described, as the pump is operated to elevate shaft 35, the resulting upward translation of axis 128 results in a counterclockwise pivotal movement of the bell cranks 127 as viewed upon FIGURE 14. This pivotal movement results in a forward translation of push rods 122 and 123 and a corresponding clockwise downward pivotal motion of roller-carrying frames 119 and 120. The parts are so interrelated that forks 37 and 38 move parallel to themselves at all times, as indicated in dashed lines upon FIGURE 14.

Operation

In operation, with the truck in lifting position beneath a load, connection 45 is released to free arm 40 of control handle or rod 44. The arm then moves to its spring-urged vertical or predetermined position and (a) the brake is set, (b) the motor circuit is opened at safety switch 92, and (c) valve 49 is firmly seated by spring 50. Thus the truck is held immobile while handle 44 may be then worked up and down to actuate the pump, force hydraulic fluid into the cylinder 36 and elevate the load over forks 37 and 38.

After the hydraulic lift has been elevated to a point where the load is fully supported by the truck and is ready for transport, rod or handle 44 is elevated to a position parallel with lever 40 and connected therewith by operation of latch 45. The lever and pole are then pivoted downwardly as a unit to a position convenient for steering and control of the driving motor. This motion releases the brake shoes 111 and 112 from drum 110, shifts plunger 109 to close the safety switch 92, and forces valve 49 off its seat to render the hydraulic lift inoperable, all in the manner previously described.

The motor is now under control of manual switches conveniently mounted in box 72 at the free end of control handle 44 so that the motor may be energized in one direction or the other to correspondingly impel the truck in the desired direction while, at the same time, it may be steered by operation of handle 44 to turn the entire propelling unit about the vertical axis of shaft or piston 35.

When the truck has been thus maneuvered into the position at the spot where the load is to be deposited, the handle 44 may be released for movement with lever 40 into the position shown upon FIGURES 5, 6, 14 and 15 to set the brakes, etc., as previously described. Or, alternatively, latch 45 may be released in any position of handle 44 to release lever 40 therefrom to thereby enable lever 40 to move to the vertical or other predetermined angular position. In either case, the brakes are set and the motor circuit is opened so that the truck is immobilized until the load has been deposited and the truck is again ready for movement to a loading station. During the aforesaid movement of the truck in transport, valve 63 holds the pressure in cylinder 36 and the load is held elevated. When the truck has been maneuvered into position where the load is to be deposited, valve 70 is manually opened to release pressure in cylinder 36 and permit the forks to lower to deposit the load and its pallet. It is also contemplated that an additional cam, not shown, may be fixed on shaft 39 and so connected with valve 70 that the latter cannot be opened to release fluid under pressure in the hydraulic cylinder and, of course, the load cannot be lowered or deposited, unless and until arm 40 has moved to the vertical position. Alternatively, valve 70 may be a solenoid-controlled unit in a circuit including switches, not shown, one in box 72 and a second fixed adjacent shaft 39. The arrangement will be such that the second switch is closed by a cam on shaft 39, only when lever 40 is in the aforementioned vertical position. Hence, valve 70 can be opened to lower the load only after lever 40 has moved to its spring-urged vertical position, the brakes set, and the circuit of motor 6 positively opened.

I have hereby provided a control for lift trucks which is rapid, simple and certain in operation and which, at the same time, provides safe, sure operation.

The lift element of the truck cannot be raised or lowered while the truck is mobile and when in position to lift or to deposit a load, the arm 40 must be in its vertical position before the load can be lifted or deposited. When in such position, the truck is immediately and automatically immobilized by setting of the brakes and opening of the driving motor control circuit. Then the load may be deposited.

While I have disclosed the form of the invention presently preferred, and have shown it in connection with a specific form or type of lift truck, it will be appreciated that it is adaptable to a wide variety of conveyances and many modifications, alterations, changes and substitutions of equivalents will occur to those skilled in the art after a study of the foregoing disclosure.

Consequently, the disclosure should be taken in an illustrative rather than a limiting sense; and it is my desire and intention to reserve all changes and substitutions within the scope of the subjoined claims.

In the claims, the terms "horizontal" and "vertical" refer to the positions of the parts with the machine in use on a substantially level supporting surface.

Having now fully disclosed the invention, what I claim and desire to secure by Letters Patent is:

1. In a control unit for a conveyance, a frame, a ground-engaging driving wheel journaled in said frame, a motor carried by said frame and connected with said wheel for rotating the same, a control element mounted on said frame for pivotal movement about a horizontal axis and spring-urged into a first position about said axis, a steering rod carried by said frame for pivoting about said horizontal axis, a control circuit for said motor including a safety switch on said frame, means operated by pivoting of said control element to said first position, to open said safety switch, and means manually operable positively to connect and disconnect said rod and element, said rod and element pivoting as a unit when interconnected.

2. In a control unit for a conveyance, a frame, a ground-engaging driving wheel journaled in said frame, a motor mounted in said frame and connected with said wheel to drive said conveyance, a horizontal shaft journaled in said frame, a lever arm fixed with said shaft, said shaft and arm being spring-urged to predetermined angular position, a steering rod journaled on said shaft for swinging in a plane normal thereto, a control circuit for said motor including a manually-actuable switch on said rod and a normally closed safety switch on said frame, in series, means carried by said shaft to open said safety switch only when said shaft is in said predetermined position, and means manually operable to connect and disconnect said rod and lever arm, said rod and lever arm pivoting as a unit when interconnected.

3. In a self-propelled, wheeled load conveyance, a frame, a motor-driven, ground-engaging wheel supporting said conveyance, a control shaft and a steering rod independently pivoted to said frame on a common horizontal axis, a lever arm fixed with said shaft, a manually releasable connection between said arm and rod, said shaft and arm being spring-urged to predetermined rotational position, and means actuated by movement of said shaft and arm into said position to immobilize said conveyance, said rod when connected with said arm by said releasable connection, pivoting as a unit therewith.

4. In a self-propelled steering unit for a conveyance, a frame, a motor-driven, ground-engaging wheel journaled in and supporting said frame, brake means for said wheel, a safety switch for the driving motor of said conveyance, a shaft journaled in said frame for rotation on an axis fixed therewith and spring-urged to predetermined rotational position about said axis, a steering handle journaled on said frame for pivoting about said axis normal to said handle, a manually releasable connection between said shaft and handle, and cam means fixed with said shaft and controlling said brake means and said safety switch, respectively, said cam means opening said safety switch and effecting application of said brake means, only when said shaft is pivoted to said predetermined rotational position, said handle and shaft pivoting as a unit when interconnected by said releasable connection.

5. A self-propelled steering and lift unit for a vehicle comprising a frame, a ground-engaging wheel journaled in and supporting said frame, a motor carried by said frame and connected with said wheel to drive the same, a brake drum connected with said motor for synchronous rotation therewith, brake means carried by said frame for releasable engagement with said drum, a horizontal shaft journaled on said frame, a steering rod journaled on said shaft, a manually releasable connection between said shaft and rod, said shaft being spring-urged to a predetermined rotational position, means carried by said shaft effecting engagement of said brake means with said drum by and in response to movement of said shaft into said predetermined rotational position only, said shaft being movable as a unit by and with said steering rod when connected therewith, to release said brake means.

6. A unit as claimed in claim 5, a normally closed safety switch carried by said frame to control said motor, and cam means fixed on said shaft and opening said switch by and in response to movement of said shaft into said predetermined rotational position.

7. A driving and lifting unit for a lift truck comprising a frame, motor-driven, ground-engaging driving wheel supporting said unit, a steering and control handle pivoted to said frame on a horizontal axis, releasable brake means associated with said wheel, a safety switch for said motor and carried by said frame, a hydraulic load lift carried by said frame, means operable by pivotal motion of said handle to operate said load lift, a control element movably mounted on said frame and (a) effecting application of said brake means, (b) opening of said safety switch and (c) rendering said load lift operable, by and in response to movement of said control element into a predetermined position, and a releasable connection between said control element and handle.

8. A unit as in claim 7, said handle being connectable with said control element by said releasable connection, only when said handle is moved to a position ineffective for steering.

9. In a self-propelled lift unit for a lift truck having a frame, lifting means and propelling motor carried by said frame, a control element movably mounted on said frame, and yieldingly urged into a predetermined position relatively to said frame, a steering handle journaled on said frame and operable to actuate said lifting means, a releasable connection between said control element and handle, control means responsive to movement of said control element into said predetermined position to render said lifting means effective, said control means rendering said lifting means ineffective when moved with said handle out of said predetermined position, a ground-engaging traction wheel journaled in said frame and supporting the same, and a driving connection between said motor and said wheel.

10. A lift unit as recited in claim 9, said steering handle being journaled on said frame about a horizontal axis between substantially vertical and substantially horizontal limiting positions, said predetermined position of said control element corresponding to one said limiting position of said handle.

11. In a self-propelled hydraulic lift unit for a lift truck, a frame, a ground-engaging wheel supporting said unit, a motor carried by said frame and connected with said wheel to rotate the same, a hydraulic lift carried by said frame, a steering and control handle pivoted to said frame on a horizontal axis for movement from a first position ineffective for steering, to a second steering position, pump means connected with said handle and operated by oscillation of said handle in steering position to force fluid under pressure into said hydraulic lift, a hydraulic pressure line connecting said pump means and said hydraulic lift, a valve in said line and having a pressure fluid inlet, a first outlet to said lift and a bypass outlet to sump, an operating part for said valve movable between a first position connecting said inlet to said first outlet, and a second position closing said first outlet and connecting said inlet to said by-pass outlet, a control element carried by said frame and movable to operate said valve part between said first and second positions, means yieldingly urging said control element to a first position effecting movement of said valve operating part to its first position, and a releasable connection between said handle and said control element, movement of said handle to steering position when connected with said control element, effecting synchronous movement of said control element to correspondingly move said valve operating part to second position.

12. A lift truck comprising a lift platform, a propelling, lifting and steering unit comprising a frame, a motor driven ground-engaging wheel journaled in said frame, hydraulic lift means carried by said frame and including a vertical piston swivelly supporting said platform at one end thereof, a horizontal shaft journaled in said frame, a lever arm fixed with said shaft radially thereof and spring-urged into vertical position, a steering and control handle journaled on said shaft and operable to turn said unit about the axis of said piston to steer the truck, a pump, means operated by oscillation of said handle to actuate said pump, conduit means connecting said pump and the cylinder of said hydraulic lift means and including a normally-closed valve, a first cam on said shaft and actuating said valve to effect closure thereof and thus render said pump effective upon said hydraulic lift means only when said lever arm is in said vertical position, said cam operating said valve to hold the same open and thus connect said pump directly to exhaust by and in response to movement of said lever arm out of vertical position, a releasable connection between said handle and lever arm, and a check valve in said conduit means, releasably holding pressure in said hydraulic lift means.

13. A lift truck as in claim 12, a brake drum connected with said wheel for rotation therewith, a second cam fixed on said shaft, a pair of brake shoes pivoted on said frame and extending about said drum each including an arm extending adjacent a respective side of said arm, said cam effecting braking engagement of said shoes with said drum only when said lever arm is in said vertical position and movable with said handle out of said vertical position to free said drum.

14. A lift truck as in claim 13, a normally-closed safety switch to control the energizing circuit of the propelling motor of said truck and including a plunger operable to open the contacts thereof, and a third cam fixed on said shaft and operable to so operate siad plunger only when said lever arm is vertical.

15. In a lift truck, a self-propelled steering, control and lift unit including a frame, a motor-driven, ground-engaging wheel journaled in said frame, a hydraulic load lift carried by said frame, a steering handle carried by said frame for pivotal movement about an axis, and movable from a first position wherein it is ineffective for steering, to a second steering position, a control element movably carried by said frame and yieldingly urged to predetermined position, means operable by pivotal movement of said handle to force pressure fluid into said hydraulic lift, a valve between said means and lift, said control element actuating said valve to effect connection between said means and lift only when in said predetermined position, a releasable connection between said handle and control element and operable to connect the two when said control element is in said predetermined position, only by movement of said handle to its position ineffective for steering.

16. A unit as recited in claim 15, said axis being horizontal, said predetermined position of said control element corresponding to a vertical position of said handle.

17. In a lift truck, load-supporting means, a propelling and steering unit including a motor-driven, ground-engaging wheel, a hydraulic cylinder carried by said unit, a piston fitting said cylinder for vertical translation therein, a connection between the top end of said piston and the rearward end of said load-supporting means to form a load-lifting and vertical-axis pivotal connection therewith, ground-engaging wheels at the forward end of said load-supporting means, means mounting said wheels for conjoint vertical movement with respect to said load-supporting means, and mechanical connections with said wheel-mounting means to operate the same by and in response to relative vertical movement between said unit and the rearward end of said load-supporting means, said mechanical connections including a horizontal ring fixed with said load-supporting means and swiveled to said unit coaxially of the axis of said piston and spaced vertically below the top end of said piston.

18. In a lift truck, a load-supporting chassis, a frame pivotally connected with said chassis and supporting the same at one end thereof, a ground-engaging traction wheel journaled in said frame on a horizontal axis fixed therewith, a motor mounted in said frame, a driving connection between said motor and traction wheel, brake means carried by said frame and operable to brake said wheel and motor, a hydraulic cylinder carried by said frame, a vertical plunger slidable in said cylinder and connected at its upper end with said chassis whereby introduction of pressure fluid into said cylinder elevates said one end of said chassis, said cylinder and plunger forming a vertical pivot axis between said frame and chassis, a control member pivoted on said frame on a horizontal axis and spring-urged to predetermined position, a steering pole independently journaled on said frame for oscillation about said axis, a pump carried by said frame, means directly operating said pump by and in response to oscillation of said pole about said axis, a first hydraulic pressure line connecting said pump and cylinder, a second hydraulic line connecting said pump with fluid intake, and including a normally-closed one-way valve, electric circuit means controlling energization of said motor and including a normally-closed safety switch, and first, second and third cam means fixed with said control member, and operating respectively, when said member is in said predetermined position to respectively (1) render said brake means effective to immobilize said truck, (2) open said safety switch, and (3) render said valve effective and means manually operable to connect and disconnect said control member and pole, said control member and pole pivoting as a unit when so connected, movement of said control member out of said predetermined position, under connection with said pole, effecting closure of said switch, release of said brake means, and opening of said valve to render said pump ineffective to force pressure fluid into said hydraulic cylinder.

19. A lift truck as in claim 18, said control member comprising a horizontal shaft journaled in said frame and a lever arm fixed with and projecting radially from said shaft, said pole being journaled on said shaft, and means releasably connecting the distal end of said lever arm with said pole.

20. A lift truck as in claim 19, said cam means comprising cams fixed in axially-spaced relation on and along said shaft, said cams being generally circular, each having a segmental portion removed to form a flat thereon.

21. A lift truck as in claim 18, said control member comprising a shaft journaled in said frame and a lever arm fixed with and projecting radially from said shaft, said lever arm being substantially vertical in said predetermined position, said manually operable means directly connecting the distal end of said lever arm and said pole, whereby said pole must be moved to vertical position for operation of said manually operable means to connect the same with said lever arm, said first cam means being operable to render said brake means effective in a second rotational position of said lever arm corresponding to a lowered position of said pole.

22. A lift truck as in claim 21, said lever arm in all rotational positions between said vertical and said second rotational positions under connection with said pole, operating said cam means to release said brake means, close said safety switch and effect opening of said valve.

References Cited in the file of this patent

UNITED STATES PATENTS

| | | |
|---|---|---|
| 2,254,331 | Stuebing | Sept. 2, 1941 |
| 2,592,091 | Weaver | Apr. 8, 1952 |
| 2,840,175 | Ulinski | June 24, 1958 |

FOREIGN PATENTS

| | | |
|---|---|---|
| 1,056,722 | France | Oct. 21, 1953 |